United States Patent Office 3,513,558
Patented May 26, 1970

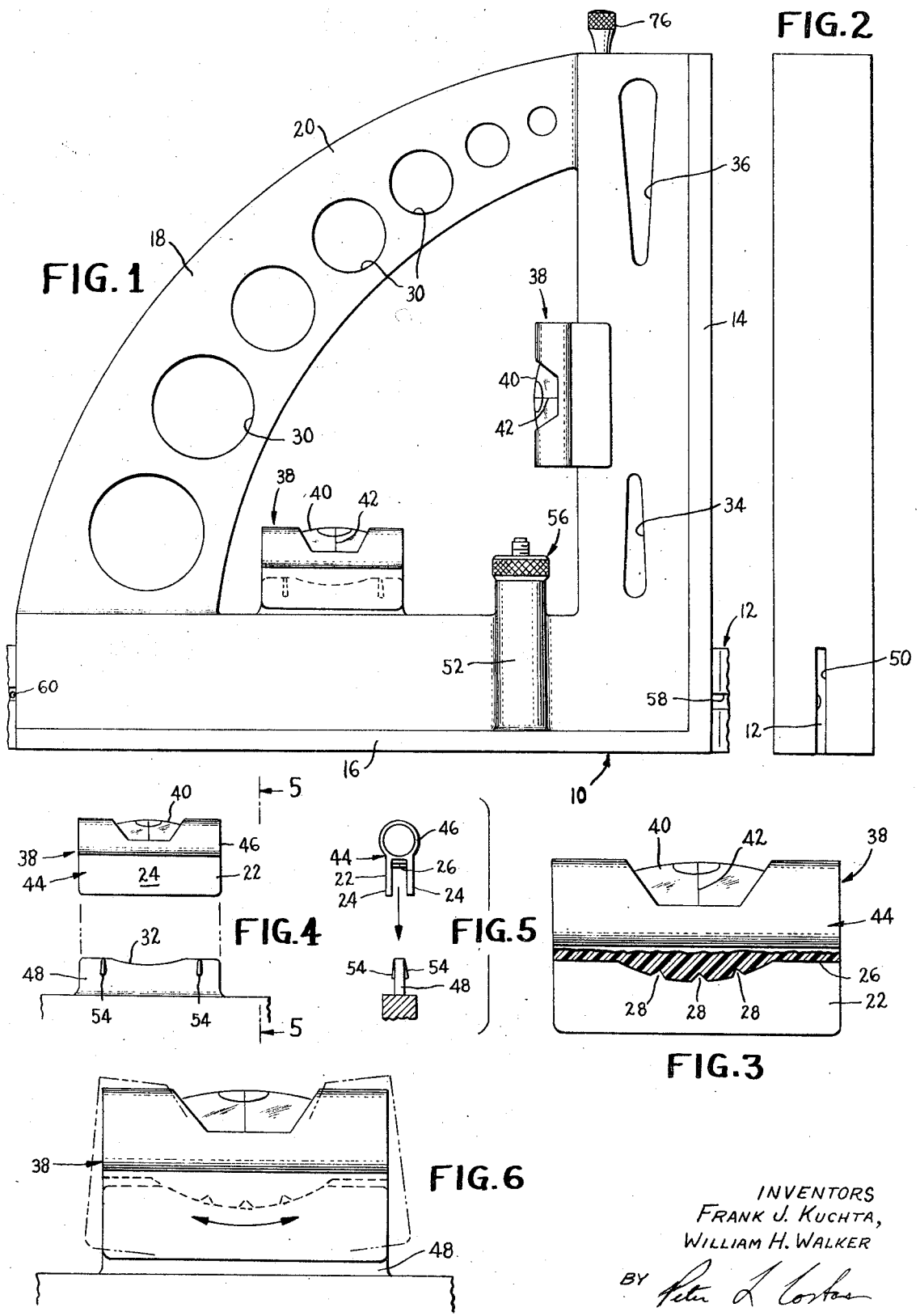

3,513,558
LEVEL AND METHOD OF MAKING SAME
Frank J. Kuchta, New Britain, and William H. Walker, Meriden, Conn., assignors to The Stanley Works, New Britain, Conn., a corporation of Connecticut
Filed Feb. 9, 1968, Ser. No. 704,292
Int. Cl. G01c 9/28
U.S. Cl. 33—213                                          7 Claims

ABSTRACT OF THE DISCLOSURE

There is disclosed a novel level construction wherein the leg of the level has spaced from the planar surface thereof a seating portion with an arcuate surface. A level member having a level vial and a mounting member of synthetic plastic material seating the vial and providing a mounting portion with a cooperating arcuate surface is seated thereon and is secured thereto in the desired calibrated position by adhesive or other suitable means.

REFERENCE TO RELATED APPLICATIONS

The details of the construction of the measuring tool and its use for a multiplicity of measuring functions are described and claimed in the copending application of Wojciech Stanley Gutowski, Frank Joseph Kuchta, and Robert Ferguson West, entitled Measuring Tool, Ser. No. 814,513, filed Apr. 1, 1969 as a continuation-in-part of application Ser. No. 676,219, filed Oct. 18, 1967, now abandoned. The design of the tool is set forth and claimed in the copending design application of the same inventors entitled Design for a Measuring Tool, Ser. No. 9,304, filed Nov. 7, 1967, now U.S. Letters Pat. No. Des. 213,643, granted Mar. 25, 1969.

BACKGROUND OF THE INVENTION

Generally, various tools are customarily used by the craftsman for measuring and aligning functions. Among the most useful tools are levels and the combination T-square and level which not only permits the user to verify the planar nature of a surface but also to scribe straight lines and establish right angles.

Such levels generally employ a vial containing a liquid which is mounted in a suitable recess in the leg of the level or upon the inner edge thereof. Assembly of the vials desirably requires calibration of the parallel relationship of the vial to the planar surface of the leg, or even the desired angularity for some more complex devices, to avoid any deviation which would create problems during use. As a result, assembly operations utilizing calibration are relatively critical and require securing the vial member in calibrated position after it has been determined, so that considerable time may be required.

It is an object of the present invention to provide a level having a novel and highly effective construction for mounting a level vial.

It is also an object to provide such a level wherein a level member containing the level vial may be simply and relatively inexpensively fabricated and may be readily adjusted into the desired angular orientation during assembly to the body of the level.

Another object is to provide a simple and rapid method for assembling a level vial onto the body of a level or the like and securing it in adjusted position.

SUMMARY OF THE INVENTION

It has now been found that foregoing and related objects and advantages can be readily attained in a level or similar measuring tool with at least one leg having a substantially planar surface along one edge for stable placement upon a workpiece or surface of which the orientation is to be determined. The leg is provided with a seating portion spaced from the planar surface thereof which provides an arcuate seating surface having a chord lying in a plane extending normally to the longitudinal axis of the leg and its planar surface. A level member is mounted on the seating portion and includes a level vial which extends in the plane of the chord and is of generally U-shaped cross section with the spaced arms thereof being disposed against opposite side surfaces of the leg seating portion. The web of the mounting portion between the arms thereof has an arcuate surface or configuration extending longitudinally of the level vial and cooperating with the arcuate surface of the seating portion so as to seat stably thereon. The mounting portion of the level member is secured to the seating portion of the leg in calibrated portion by suitable means such as adhesives and the like.

In its preferred aspect, the level or measuring tool utilizes a leg which is provided with a concave recess in its edge surface opposite the seating surface, and this recess may be provided in an upstanding boss to minimize the thickness of the web of the leg about which the level member must fit. In this preferred embodiment, the level member mounting portion has a web with a convexly arcuate configuration so as to cooperate with the curvature of the seating portion. In levels or measuring tools having two legs which intersect at a right or other included angle, each leg is desirably provided with a level member mounted as described herein to ensure proper orientation of the tool with respect to the workpiece.

The term "level" as used herein includes measuring tools having a single rectilinear leg, squares having a pair of legs intersecting at a right angle and other measuring tools having at least one leg which is intended for placement against a surface of a workpiece or structure to determine the orientation thereof with respect to a plane which may be horizontal, vertical or at some other angle to the horizontal.

In assembling the level, calibration of the level member relative to the planar surface of the leg is readily established. The level body member is placed upon a calibrating support member having the necessary reference plane. The level member is placed upon the seating portion of the level body member, and then is slid along the arcuate surface of the seating portion of the leg until the calibrated position is obtained. Then it is secured in position by any suitable means, most conveniently by adhesive which has been preapplied and which sets rapidly upon attainment of the calibrated position.

BRIEF DESCRIPTION OF THE DRAWING

FIG. 1 is a fragmentary side elevational view of a combination level measuring tool embodying the present invention;

FIG. 2 is an end elevational view thereof;

FIG. 3 is a fragmentary side elevational view of the level mounting portion of the tool to a greatly enlarged scale and with the portion of the level member broken away to reveal internal construction;

FIG. 4 is a similar view with the level member shown detached therefrom;

FIG. 5 is a fragmentary sectional view along the line 5—5 of FIG. 2 but to a greatly enlarged scale; and FIG. 6 is a view similar to FIG. 3 with the level member shown in phantom line in two positions indicating relative movement to the level member along the level seating portion.

DESCRIPTION OF THE ILLUSTRATED EMBODIMENT

Turning now to the attached drawing in detail, there is illustrated a combination measuring tool embodying the present invention and having an integrally formed body member generally designated by the numeral 10 and an elongated measuring blade generally designated by the numeral 12. The body member 10 has a pair of legs 14, 16 of generally T-shaped cross-section which intersect at a right angle, and a web 18 with a convexly arcuate body portion 20 and arm portions (not shown) at the ends thereof. The arm portions join to the legs 14, 16 and are dimensioned to space the body portion 20 so that the side surface opposite that illustrated in FIG. 1 is coplanar with the corresponding side edge surfaces of the legs 14, 16.

Within the body portion 20 and spaced along the length thereof are a multiplicity of apertures 30 of different diameter which may be used to measure dowels, tubing and the like. Indicia (not shown) of the size of the several apertures 30 may be integrally formed in the material of the body portion 20 or affixed thereto by printing, decals or the like. Spaced along the outer edge of the arcuate body portion 20 of the web 18 may be provided a multiplicity of indicia (not shown) of included angle provided by radial lines and numbers. Such indicia are preferably integrally formed in the material of the body portion 20 although they may also be affixed thereto by printing, decals or the like.

The leg 14 has a pair of apertures 34, 36 therein with converging side walls configured and dimensioned to permit measurement of the size of screws and nails. Suitable indicia (not shown) are provided on the leg 14 adjacent the apertures to identify the pertinent information. For example, the aperture 34 may be used for common nails, and the shank of the nail slid along the aperture until tightly received therein, at which point the identifying indicium may be read. Similarly, the aperture 36 may be used for screws by inserting the screw therein until the head is sliding on the surface of the leg and then sliding the screw toward the converging end until the screw is tightly received, at which point the identifying indicium is read.

The leg 16 has a channel or slot 50 extending throughout the length thereof and opening at its outer surface. A generally cylindrical boss 52 on its inwardly extending portion has therein a cylindrical bore (not shown) extending normally to the channel 50 and communicating therewith and in which is seated the blade retaining assembly generally designated by the numeral 56.

The measuring blade 12 has a groove 58 in one side face thereof extending along its full length, and holes 60 therethrough are spaced along the length of the blade 12 at predetermined intervals, preferably each one-half inch. Suitable indicia (not shown) of length are provided along the length of the bottom edge of the blade 12, preferably on both side surfaces. To permit use of the blade 12 as a compass, a second set of indicia (not shown) of length may be provided along the top edge of the blade, preferably only on one side surface and based upon measurement of length starting from the first of the holes 60 in the blade 12.

The blade 12 and channel 50 are cooperatively dimensioned in the illustrated embodiment so that the outer edge surface of the blade 12 is substantially coplanar with the outer surface of the leg 16 to provide highly stable seating of the tool upon or against a planar surface and optimum determination of the planar character of a surface against which placed. In addition, the channel 50 and blade 12 are cooperatively dimensioned in width or thickness so that the blade 12 is slidably retained therein with only a small amount of clearance to minimize play therebetween.

To determine level and plumb with the tool, a pair of level members generally designated by the numeral 38 are mounted on the legs 14, 16. In accordance with the present invention, each of the level members 38 includes a conventional liquid filled tube or vial 40 with center line 42 and a housing generally designated by the numeral 44 and having a body portion 46 with an aperture therein seating the vial 40 and a mounting portion 22 with a generally U-shaped cross section. As best seen in FIGS. 3 and 5, the mounting portion 22 has a pair of arms 24 and a web 26 therebetween which has a convexly arcuate surface in the direction extending longitudinally of the vial 40. In addition, a plurality of transversely extending recesses or grooves 28 are provided in the web 26 along the length thereof for a purpose to be described more fully hereinafter.

Although the thickness of the leg 14 adjacent its inner edge is sufficiently small to permit the mounting portion 22 to fit snugly thereover, the leg 16 is of greater thickness to accommodate the blade 12 and is provided with an upstanding boss 48 on its inner edge of a thickness cooperating with the spacing between the arms 24 of the level member mounting portion 22. In the former instance, a portion of the body of the leg 14 provides the seating portion for the level member 38 and, in the latter instance, the boss 48 provides the seating portion. In both instances, the seating portion of the legs 14, 16 has a recess 32 in its inner edge with a concavely arcuate surface which has its chord lying in a plane extending parallel to the plane or longitudinal axis of the planar surface of its leg 14, 16. The boss 48 is provided with a pair of ribs 54 on each of its side surfaces which extend normally to the planar surface of the leg 16, and the seating portion of the leg 14 is provided with similar ribs (not shown), both for a purpose to be described hereinafter.

The arcuate surface 32 of the boss 48 or seating portion and the arcuate surface of the web 26 are defined by closely equivalent radii so as to provide a relatively close fit therebetween and permit stable adjustment during assembly. Similarly, the spacing between the arms 24 and the thickness of the seating portion of the leg 14 or the thickness of the boss cooperate so that the arms 24 fit snugly about the side surfaces of the mounting portion to facilitate stable adjustment during assembly and to enhance permanent engagement during use. In this connection, the ribs 54 on the side surfaces of the mounting portions taper to an increased width adjacent the planar surface of the legs 14, 16 so as to cam the arms 24 apart and increase frictional surface engagement.

In the illustrated embodiment, the level member 38 is secured in adjusted position upon the seating portion of the legs 14, 16 by interposed adhesive (not shown). The grooves 28 in the web 26 accommodate excess adhesive applied to the cooperating surfaces.

In using the tool as a square, a level or a plumb, it can be seen that the blade 12 which is coplanar with the outer planar surface of the leg 16 of the body member 10 provides an extended length of planar surface from which a reference measurement is to be made. The horizontal orientation of the support surface may be determined by reference to either level member 38 depending upon which of the legs 14, 16 is disposed in the horizontal attitude. The body member 10 may be butted up against a corner to determine whether the corner is square or right angular, or against any upright to determine whether a surface is vertical by use of the level member 38 on the horizontally disposed legs 14, 16. It will also be appreciated that the extended length of planar surface provided by the blade 12 and leg 16 affords significant advantages in providing a guide for a saw, or the like, to ensure a square cut.

To use the tool as a marking gauge, the blade 12 is adjusted so that one of the holes 60 therein corresponds to the desired length from the outer surface of the leg 14. Then the scriber 76 or a pencil or another suitable device may be inserted into the hole 60 and the tool moved along the edge of the work piece so as to scribe the desired line along the length thereof.

To establish a desired included angle, the body member 10 is placed upon the work surface with juncture between the legs 14, 16 registering with a mark indicating the base point. The proper angle is then marked by reference to the indicia (not shown) along the length of the web 18. Thereafter the blade 12 may be withdrawn from the body member 10 and aligned between the base point and the mark registering with the desired angle so as to provide a reference line for cutting or other suitable operations. It can be seen that the scriber 76 may be usefully employed for making both marks.

The present invention is also useful as a beam compass since the blade 12 may be removed from the body member. To scribe an arc or circle of predetermined radius, the blade member is first affixed or positioned at a desired reference point by extending a member through the first of the holes 60 therein. The scriber 76 is highly useful in securing the blade 12 in position because the steel tip permits relatively firm positioning. A pencil or other suitable marker is then inserted through a hole 60 corresponding to the desired radius and the blade 12 is pivoted or rotated about its fixed point to scribe the desired arc or circle.

As previously indicated the apertures 34 and 36 in the leg 14 are quite useful in determining the size of screws and nails. Similarly, the apertures 30 and the web 18 are useful for determining the diameter of dowels or like cylindrical materials. The tool may also be utilized for various other operations wherein a guide surface or a right angular member is desirable, and the blade 12 itself may be separated from the body member 10 for still further independent functioning requiring merely a straight edge.

Although the illustrated embodiment utilizes concave recesses in the seating portions of the legs 14, 16 which coincide with the inner edges of the legs, it will be appreciated that the seating portions may, in fact, be provided in areas of the legs abutting suitable apertures formed therein. Thus, a circular aperture in the body portion of a leg may not only provide the desired arcuate surface but also the necessary space to position a level member therewithin. Such an embodiment offers certain advantages in protecting the level member from some of the hazards occurring during use of the tool.

Although the seating portion has been shown as having a concavely arcuate surface and the web of the level member has been shown as having a convexly arcuate surface, these may be interchanged if so desired since it is important only that the two surfaces be cooperatively arcuate to facilitate adjustment and subsequent engagement. Moreover, it may be desirable to include ribs on the inside surfaces of the arms 24 of the level member housing 44 to enhance frictional engagement during adjustment and initial assembly as well as to decrease the tolerance factor in dimensioning of the spacing between the arms 24. Additional grooves may be provided in either the seating portion or the surfaces of the housing 44 of the level member 38 to accommodate excess adhesive when such is employed.

In addition to the adhesive which has been found to provide extremely facile assembly, other means for securing the level members to the seating portions of the level bodies may be employed. Generally, frictional engagement will not be completely satisfactory and some additional securing means is desirable. Solvent or heat application to the surfaces of certain synthetic plastic members used for the housing 44 may suffice to provide the necessary adhesion in place of an interposed adhesive coating. Portions of the overlying arms 24 and seating portion may be deformed by staking or the like to effect mechanical engagement and locking thereof. Pins or rivets may be inserted or any other suitable means known to those having ordinary skill in the art may be employed to lock the two elements together.

In assembling the level member 38 onto the boss 48, the arms 24 and web 26 are first coated with an adhesive. The arms 24 are then fitted over the side surfaces of the boss 48 and the level member 38 pressed down until its arcuate web 26 seats in the arcuate surface 32 of the boss 48. The level member 38 is then moved relative to the boss 48 by sliding engagement of the two cooperating arcuate surfaces until the desired calibrated position thereof is attained. Then the assembler allows the two parts to remain in adjusted position for a period of time sufficient to allow the adhesive to set completely and bond the two parts together. Normally the frictional engagement will be sufficient to maintain the two parts in the calibrated position so that no further tools or fixtures are necessary.

The level members 38 are most conveniently fabricated from a separate vial which is fitted into or molded into a housing in the manner shown in the illustrated embodiment. Other means for mounting the level vial in the housing may also be employed if so desired. Although the housing 44 may be fabricated from other materials including metals and ceramics, preferably synthetic plastics are employed so as to facilitate fabrication in the desired configuration and assembly by reason of the inherent resiliency and ease of adhesion to the surface of the body of the level. Injection molding of thermoplastics has proven particularly advantageous.

The body member is desirably integrally formed of a relatively durable material such as metal or impact-resistant synthetic plastic. Metal castings have proven to be highly satisfactory although both injection molded and compression molded synthetic plastics may be equally well employed. The desired arcuate surfaces in the body member of the level may be machined thereinto although they are most conveniently formed at the time of molding or casting thereof.

Thus, it can be seen that the present invention provides a level which is relatively simple and rugged in construction and which may be easily assembled into the desired calibration of the level vial with respect to the planar surface of the associated leg of the level body. In assembling the level member to the level body, the cooperating arcuate surfaces enable stable adjustment as the level member is slid in the desired direction, and the arms of the level member permit use of frictional pressures to facilitate adjustment and retention of the level member in the desired position prior to effecting permanent engagement thereof. In this manner complex structures to ensure the desired alignment of the level vial, or jigs to facilitate the placement of the vial in the desired position, or the need for extremely close tolerances in cooperatively configured parts, may be avoided.

Having thus described the invention, we claim:

1. In a level, the combination comprising: a leg having a substantially planar surface for stable placement upon a workpiece and a seating portion spaced therefrom providing an arcuate surface having a chord tying in a plane extending parallel to the longitudinal axis of said leg; a level member having a level vial and a mounting member with a body portion providing an aperture at one end seating said level vial for viewing thereof and providing at the other end thereof a mounting portion of inverted generally U-shaped cross-section with the spaced arms thereof being disposed and resiliently bearing upon opposite side surfaces of said leg seating portion, the web of said mounting portion between said arms having an arcuate surface extending longitudinally of said level vial and cooperating with said arcuate surface of said seating portion so as to seat stably thereon, said mounting member being integrally formed from synthetic plastic material and having its mounting portion dimensioned cooperatively with said leg seating portion; means adhesively securing said level member to said seating portion of said leg.

2. The combination in accordance with claim 1 wherein said seating portion of said leg provides a concave recess defining said arcuate surface thereof and wherein said level member web is of convex configuration longitudinally of said level vial so as to seat snugly in said recess.

3. The combination in accordance with claim 1 wherein said leg has a body portion providing said planar surface and a boss thereon providing said seating portion.

4. The combination in accordance with claim 1 wherein said level member has recesses in said arcuate surface of said web extending transversely thereof between said arms.

5. The combination in accordance with claim 1 wherein said leg seating portion has ribs on the opposite side surfaces thereof extending generally normally to said planar surface.

6. The combination in accordance with claim 1 wherein a second leg extends substantially normally to said first-mentioned leg and is provided with a substantially planar surface for placement upon a workpiece and a seating portion spaced from the planar surface thereof with a similarly configured arcuate surface and wherein a second level member constructed and configured similarly to said first-mentioned level member is seated upon and secured to said seating portion thereof.

7. The combination in accordance with claim 6 wherein said level members have recesses in their webs extending transversely between said arms thereof and wherein said legs have ribs on the opposite side surfaces of said seating portions extending generally normally to said planar surfaces thereof.

References Cited

UNITED STATES PATENTS

| | | | |
|---|---|---|---|
| 883,783 | 4/1908 | Buys et al. | 33—207 |
| 959,296 | 5/1910 | Bodmer | 33—213 |
| 1,829,257 | 10/1931 | Best | 33—213 |
| 2,386,833 | 10/1945 | Baldwin | 33—207 |
| 2,961,774 | 11/1960 | Drier | 33—211 |
| 2,502,905 | 4/1950 | Vaida | 33—211 |

LEONARD FORMAN, Primary Examiner

D. A. DEARING, Assistant Examiner

U.S. Cl. X.R.

33—89, 112